United States Patent
Brooks et al.

[15] 3,705,641
[45] Dec. 12, 1972

[54] DISC BRAKE

[72] Inventors: Frank W. Brooks; Norman L. Gebhart, both of Dayton, Ohio

[73] Assignee: General Motors Corporation, Detroit, Mich.

[22] Filed: Jan. 20, 1971

[21] Appl. No.: 108,099

[52] U.S. Cl. ................................................188/73.3
[51] Int. Cl. ............................................F16d 69/04
[58] Field of Search...................188/73.3, 71.1, 73.4

[56] References Cited

UNITED STATES PATENTS

| | | | |
|---|---|---|---|
| 2,657,772 | 11/1953 | Chamberlain | 188/73.3 X |
| 3,035,664 | 5/1962 | Desvignes et al. | 188/73.3 X |
| 3,330,385 | 7/1967 | Swift | 188/73.4 |

FOREIGN PATENTS OR APPLICATIONS

| | | | |
|---|---|---|---|
| 78,983 | 8/1962 | France | 188/71.1 |
| 1,015,277 | 12/1965 | Great Britain | 188/73.3 |

*Primary Examiner*—Joseph Wegbreit
*Attorney*—W. E. Finken and D. D. McGraw

[57] ABSTRACT

A disc brake for an automotive vehicle in which the caliper frame is made from a stamped steel plate and bent to form a J-section, one leg of the caliper frame having a keyhole-shaped opening through which the cylinder body is mounted and retained in place by means of a flange and tang arrangement. The brake pad assemblies are provided with projections extending into recesses formed in the other caliper leg and in the hydraulic cylinder piston to locate the pad assemblies and hold them in position. The pad assembly backing plates have arms extending to embrace a portion of the caliper frame to further locate and limit movement of the brake pad assemblies and also to transmit brake torque to the caliper frame.

6 Claims, 3 Drawing Figures

PATENTED DEC 12 1972

3,705,641

INVENTORS
Frank W. Brooks &
BY Norman L. Gebhart
D. D. McGraw
ATTORNEY

DISC BRAKE

The invention relates to a disc brake and more particularly to one of the type utilized to brake the wheels of automotive vehicles. It is a feature of the invention to provide a caliper assembly having a stamped steel plate caliper frame formed to provide a pair of legs joined by a bridging section by bending the steel plate. The longer leg provides an arrangement for receiving and mounting a cylinder body for the hydraulic cylinder portion of the caliper assembly. The hydraulic cylinder portion includes a recessed piston opening toward the disc to be braked. The brake pad assembly directly associated with the hydraulic cylinder portion has a plurality of projections extending outwardly from the backing plate on the opposite side thereof from the brake lining and so positioned and spaced that they are received within the piston recess and are closely adjacent to or abut the recess wall so as to limit movement of the brake pad assembly in a plane parallel to the plane of disc rotation. The backing plate is also formed with arms at either end which extend so as to embrace a portion of the caliper frame to further limit brake pad assembly movement while at the same time providing guiding means for axial movement of the brake pad toward and away from the disc as well as transferring brake torque to the caliper frame. The brake pad assembly on the other side of the disc from the hydraulic cylinder portion of the caliper is provided with similar extensions or projections received in recesses formed in the other caliper frame leg, and also has arms embracing the caliper frame for the same purposes.

Figure 1:
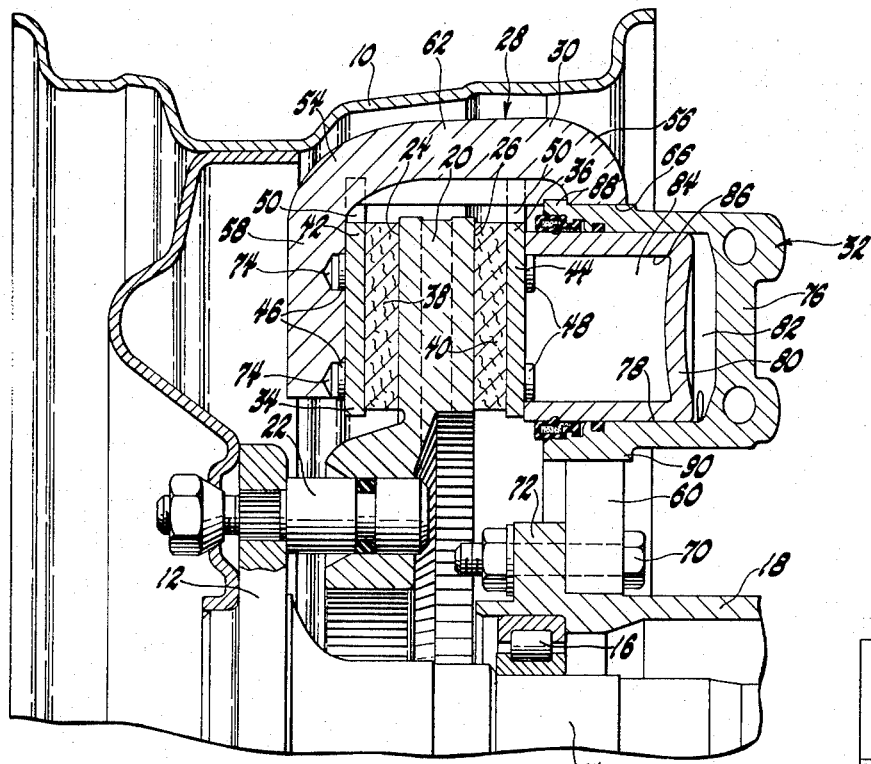
FIG. 1 is a cross section view of a disc brake assembly embodying the invention, with parts broken away.
Figure 2:
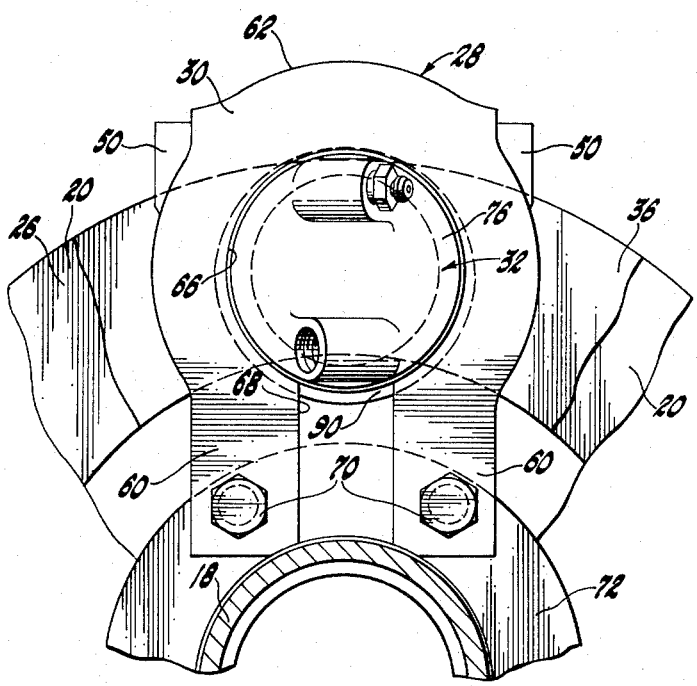
FIG. 2 is a side view of the disc brake assembly of FIG. 1, with parts broken away.

The disc brake assembly illustrated in FIG. 1 is shown as being installed in conjunction with the rear wheel of the automotive vehicle. Thus, the wheel 10 is mounted on an axle hub 12, the axle 14 being mounted for rotation in suitable bearings 16 relative to the fixed axle housing 18. In the particular construction shown, the brake is of the fixed caliper type with a sliding rotor or disc. When desired the brake can as well be manufactured so as to utilize a sliding caliper and an axially fixed disc arrangement. The invention is also adapted to being utilized in a fixed caliper, fixed disc arrangement when opposed pistons are provided.

The disc 20 is slidably mounted in a suitable manner on pins 22, which may be a part of the stud arrangement for mounting the wheel 10 to the hub 12. The disc has opposed braking surfaces 24 and 26.

The caliper assembly 28 includes a caliper frame 30, a cylinder assembly 32 and brake pad assemblies 34 and 36. The brake pad assemblies are positioned on opposite sides of the disc 20 so that the brake linings 38 and 40 can respectively engage the braking surfaces 24 and 26 in braking relation. The brake pad assemblies also include backing plates 42 and 44 to which the linings are suitably secured on one side. Backing plate 42 has a plurality of extensions or projections 46 on the opposite side thereof from the brake lining 38, two such projections being illustrated. Backing plate 44 has a similar plurality of projections 48. Each backing plate is also provided with a pair of arms 50, one arm being positioned at each end thereof, and extending generally radially outwardly relative to the disc so as to embrace the caliper frame 30.

Figure 3:
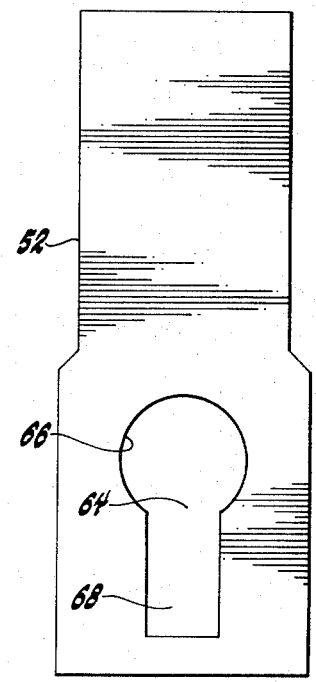
FIG. 3 is a view of a steel plate blank prior to further forming to form the caliper frame of the brake assembly of FIG. 1.

The caliper frame, which is formed from a stamped steel blank 52, illustrated in FIG. 3, is bent at 54 and 56 so that it assumes a J-shaped cross section with a shorter leg 58, a longer leg 60, and a bridging section 62 joining the two legs. Being formed from a stamping, it has a substantially constant thickness throughout. The longer leg 60 is formed from the portion of the stamped blank 52 having the keyhole-shaped opening 64 formed therein. Opening 64 is defined by the generally cylindrical opening 66, provided to receive the cylinder 32, and the channel opening 68. Suitable apertures are provided at the leg end through which mounting bolts 70 fasten the caliper frame to the mounting flange 72 of the fixed housing 18. The leg 60 extends in a plane substantially parallel to the plane of rotation of the disc 20 and is so positioned that the opening 66 is in alignment with the braking surface 26. The bridging section 62 extends over the periphery of the disc, joining the short leg 58 which is positioned in alignment with the disc braking surface 24 and in a plane substantially parallel to the plane of rotation of the disc 20. Short leg 58 has a plurality of recesses 74 formed in the surface thereof facing the disc and so spaced as to receive the brake pad assembly backing plate projections 46 therein. It can be seen that when the brake is assembled the projections 46, cooperating with the plurality of recesses 74, effectively limit translatory movement of the brake pad assembly 34 in a plane parallel to the plane of rotation of the disc.

The cylinder assembly 32 includes the cylinder housing 76 in which cylinder 78 is formed. The piston 80 is reciprocably received in cylinder 78 and cooperates therewith, with suitable seals, to provide the pressure chamber 82. Piston 80 is generally cup-shaped so that its recess 84 opens toward the disc 20. The recessed piston end abuts backing plate 44 of the brake pad assembly 36. The projections 48 of the brake pad backing plate 44 are received within the recess 84 so that they are immediately adjacent to or engage the recess wall 86 and thereby limit movement of the brake pad assembly 36 in a plane parallel to the plane of rotation of the disc.

The open end of the cylinder housing 76 is formed with a circumferentially extending flange 88 somewhat larger in diameter than the opening 66 so that when the cylinder is positioned as shown, the cylinder is located positively relative to the caliper frame 30. Flange 88 transmits the hydraulic reaction force from the cylinder housing 76 to caliper frame 30. A tang 90, which may be an axial extension of an arcuate portion of the flange 88, extends from the cylinder housing and is positioned in channel opening 68 to prevent rotational movement of the cylinder housing 76 relative to the caliper frame 30.

When pressure is applied in the chamber 82, a piston 80 moves leftwardly to move brake pad assembly 36 into braking engagement with the braking surface 26 of the disc 20. The hydraulic reaction urging the cylinder housing 76 rightwardly is exerted through flange 88 to caliper frame 30. Engagement of the brake pad assembly 36 with the disc 20 causes the disc to move leftwardly on pins 22 and engage the disc braking surface 24 with the lining 38 of the brake pad assembly 34 in braking relation.

The brake pad assemblies transmit the brake torque forces through their arms 50 to edges of the caliper frame bridging section 62. These edges also guide brake pad assembly 36 in its braking movements.

When the construction embodying the invention is utilized with an axially fixed disc and a sliding caliper, the reaction force exerted on the caliper frame moves the brake pad assembly 34 into engagement with the disc. When cylinder assemblies are provided in both legs on opposite sides of the disc, each piston in each cylinder assembly moves its associated brake pad assembly into braking engagement with the disc when pressure chambers are pressurized.

What is claimed is:

1. In a disc brake for braking a rotating disc having oppositely facing braking surfaces,
    a caliper having a first leg juxtaposed to one braking surface of the disc and a second leg juxtaposed to the other braking surface of the disc,
    first and second brake pads each having a backing plate and a friction lining, said first brake pad being associated with said first caliper leg with the friction lining thereof adapted to engage the one braking surface of the disc and said second brake pad being associated with said second caliper leg with friction lining thereof adapted to engage the other braking surface of the disc,
    actuating means including a movable recessed member having an inner peripheral surface adjacent the recess opening and carried by said first caliper leg for actuating said first brake pad to bring its friction lining into braking engagement with the one braking surface of the brake disc and for effecting a reaction force bringing the friction lining of said second brake pad into braking engagement with the other braking surface of the brake disc,
    said first friction pad backing plate having a plurality of spaced projections thereon on the other side thereof from its friction lining, said projections being received in the recessed end of said recessed member and engaging said inner peripheral surface at arcuately spaced positions to locate said first friction pad and limit movement thereof relative to the recessed member in a plane parallel to the plane of rotation of the brake disc,
    said first friction pad backing plate further having arms extending from the ends thereof and forming a notch receiving said caliper for transmitting brake torque force to said caliper and further limiting movement of said first friction pad in a plane parallel to the plane of rotation of the brake disc, said arms also guiding the movements of said first friction pad relative to said caliper toward and away from the brake disc.

2. In a disc brake for braking a rotating disc having oppositely facing braking surfaces,
    a caliper having a first leg juxtaposed to one braking surface of the disc and a second leg juxtaposed to the other braking surface of the disc,
    first and second brake pads each having a backing plate and a friction lining secured thereto, said first brake pad being associated with said first caliper leg with the friction lining thereof adapted to engage the one braking surface of the disc and said second brake pad being associated with said second caliper leg with friction lining thereof adapted to engage the other braking surface of the disc,
    actuating means including a movable recessed member carried by said first caliper leg for actuating said first brake pad to bring its friction lining into braking engagement with the one braking surface of the brake disc and for effecting a reaction force bringing the friction lining of said second brake pad into braking engagement with the other braking surface of the brake disc,
    said second friction pad backing plate having a plurality of spaced projections thereon on the other side thereof from its friction lining and said second caliper leg having a plurality of recesses formed therein and opening toward the other braking surface of the disc and receiving said projections therein to locate said second friction pad and limit translatory movement thereof relative to said caliper second leg in a plane parallel to the plane of rotation of the disc,
    said second friction pad backing plate further having arms extending from the ends thereof and forming a notch receiving said caliper for transmitting brake torque force to said caliper and further limiting movement of said second friction pad in a plane parallel to the plane of rotation of the disc.

3. A disc brake assembly comprising:
    a rotatable disc to be braked;
    a fixed support member;
    a caliper assembly including a substantially constant thickness stamped steel plate caliper frame, a brake actuator and friction pad assemblies;
    said caliper frame having a first leg mounted on said fixed support member and extending parallel to the plane of rotation of said disc on one side thereof, a second leg on the other side of said disc, and a bridging section joining said legs, said steel plate from which said frame was formed being bent at the junctions of said legs with said bridging section to provide arcuately shaped junctions,
    said first leg having a stamped opening formed therein receiving said actuator, and said friction pad assemblies being respectively mounted on said actuator and said second leg on opposite sides of said disc for braking engagement therewith when said actuator is actuated.

4. A disc brake assembly having a rotatable disc to be braked, a fixed support member, and a brake caliper including a frame and an actuator and friction pad assemblies,
    said brake caliper frame being of generally J-shaped cross section defined by a pair of spaced legs and a bridging section joining said legs, and being formed from a steel stamping having a preformed opening in one leg for mounting a brake actuator and one friction pad assembly, the other leg of said frame having recesses therein opening toward said preformed opening for mounting another friction pad assembly, said frame having a substantially constant thickness throughout said legs and said bridging section.

5. In the disc brake assembly of claim 4, said actuator including a cup-shaped piston opening toward said other leg, and said friction pad assemblies having backing plates with a plurality of extensions formed on the back sides thereof, said one friction pad assembly extensions fitting within said cup shaped piston and engaging the inner periphery thereof and said other friction pad extensions fitting within said other leg recesses to mount said friction pad assemblies in position on opposite sides of said disc, said backing plates further having end extensions fitting said frame bridging section for transmitting brake torque forces thereto.

6. A disc brake caliper comprising:
a caliper frame having parallel legs joined by a bridging section with one of said legs having a generally keyhole-shaped opening;
a cylinder body having a flange surrounding one end which is open to receive a piston, and further having a tang formed thereon which extends outwardly and axially;
said cylinder body fitting through the enlarged generally circular portion of said keyhole-shaped opening with said flange abutting said one leg and intermediate said legs for preventing movement of said cylinder away from the other of said legs and said tang fitting in the channel opening portion of said keyhole-shaped opening for preventing rotational movement of said cylinder relative to said one leg.

* * * * *